(12) United States Patent
Aoki et al.

(10) Patent No.: US 8,215,466 B2
(45) Date of Patent: Jul. 10, 2012

(54) POWER FEEDING APPARATUS FOR SLIDABLE STRUCTURAL BODY

(75) Inventors: Tohru Aoki, Kosai (JP); Hiroshi Yamashita, Kosai (JP); Kazuhiro Tsuchida, Kosai (JP); Mitsunori Tsunoda, Kosai (JP)

(73) Assignee: Yazaki Corporation, Tokyo (JP)

( * ) Notice: Subject to any disclaimer, the term of this patent is extended or adjusted under 35 U.S.C. 154(b) by 589 days.

(21) Appl. No.: 11/938,316

(22) Filed: Nov. 12, 2007

(65) Prior Publication Data

US 2008/0128232 A1    Jun. 5, 2008

(30) Foreign Application Priority Data

Nov. 13, 2006    (JP) .............. P2006-306641

(51) Int. Cl.
  *B66C 13/12*    (2006.01)
  *B60J 9/00*    (2006.01)
(52) U.S. Cl. .................. 191/12 R; 296/155
(58) Field of Classification Search ........ 191/12 R, 191/12.2 R, 12.4, 23 R; 174/69; 248/282.1, 248/284.1, 285.1; 296/155
See application file for complete search history.

(56) References Cited

U.S. PATENT DOCUMENTS

| | | | | |
|---|---|---|---|---|
| 3,710,199 | A * | 1/1973 | Cignoni, Jr. .............. | 361/827 |
| 6,701,671 | B1 * | 3/2004 | Fukumoto et al. ......... | 49/280 |
| 6,811,404 | B2 * | 11/2004 | Doshita et al. ............ | 439/34 |
| 6,945,504 | B2 * | 9/2005 | Chen et al. ............... | 248/282.1 |
| 7,009,112 | B1 * | 3/2006 | Mead et al. ............... | 174/69 |
| 7,641,260 | B2 * | 1/2010 | Ide .......................... | 296/155 |

FOREIGN PATENT DOCUMENTS

| | | |
|---|---|---|
| JP | 11-41777 A | 2/1999 |
| JP | 2001-122054 A | 5/2001 |
| JP | 2001-151042 A | 6/2001 |
| JP | 2001-197649 A | 7/2001 |
| JP | 2001-260770 A | 9/2001 |
| JP | 2002-017032 A | 1/2002 |
| JP | 2002-144981 A | 5/2002 |
| JP | 2003-032868 A | 1/2003 |
| JP | 2003-032869 A | 1/2003 |
| JP | 2003312266 A | 11/2003 |
| JP | 2006-027372 A | 2/2006 |
| JP | 2006-240604 A | 9/2006 |
| JP | 2007160953 A | 6/2007 |

OTHER PUBLICATIONS

Office Action dated Jul. 26, 2011, issued in counterpart Japanese Application No. 2006-306641.
Communication dated Jan. 31, 2012 from the Japanese Patent Office in counterpart Japanese application No. 2006-306641.

* cited by examiner

*Primary Examiner* — S. Joseph Morano
*Assistant Examiner* — R. J. McCarry, Jr.
(74) *Attorney, Agent, or Firm* — Sughrue Mion, PLLC

(57) ABSTRACT

A power feeding apparatus for a slidable structural body includes a link arm which is provided on one of the slidable structural body and a fixed structural body so as to be pivotally moved in a harness surplus length-absorbing direction of a wire harness, a harness holding portion provided on a distal end side of the link arm, and a harness fixing portion provided on the other of the slidable structural body and the fixed structural body. The link arm is formed so as to be expanded and contracted in a longitudinal direction of the link arm. The wire harness is installed to extend from the harness holding portion to the harness fixing portion.

10 Claims, 12 Drawing Sheets

POWER FEEDING APPARATUS FOR SLIDABLE STRUCTURAL BODY

BACKGROUND

This invention relates to a power feeding apparatus for a slidable structural body in which a wire harness is installed by the use of a pivotal link arm in order to continuously feed power to the slidable structural body such as a slide door of an automobile from a fixed structural body such as a vehicle body.

FIG. 8 shows a first form of a conventional power feeding apparatus for a slidable structural body (see Patent Literature 1).

This power feeding apparatus 61 includes a guide rail 53 provided horizontally on a slide door 52 of an automobile, a slider 54 slidably engaged with the guide rail 53, and a pair of openable/closable links 55, 56 of a generally mountain-shape connected at one end to the slider 54 and connected at the other end to the guide rail 54.

A wire harness 57 is installed to extend, while being bent into a generally U-shape, from the link 55 via the slider 54 to a vehicle body (58)-side fixing portion 59, and one end of the wire harness 57 is connector connected to a slide door-side wire harness 60, and the other end is connector connected to a vehicle body-side wire harness 61.

The pair of links 55, 56 are opened and closed (expanded and contracted) in accordance with the opening and closing of the slide door 52, and the slider 54 moves along the guide rail 53 relative thereto, and is always located in the vicinity of the vehicle body-side fixing portion 59.

FIG. 9 shows a second form of a conventional power feeding apparatus for a slidable structural body (see Patent Literature 2).

This power feeding apparatus 62 is constructed such that three links 65 of different lengths are swingably connected together in a horizontal direction between a slide door 63 of an automobile and a vehicle body 64, and a wire harness 65 is installed to extend from the vehicle body 64 to the slide door 63 along each link 65.

In accordance with the opening and closing of the slide door 63, each link 65 is pivotally moved in an opposite direction to absorb the amount of movement of the slide door 63.

FIG. 10 to FIG. 12 show a third form of a conventional power feeding apparatus for a slidable structural body (see Patent Literature 3).

This power feeding apparatus 67 includes a synthetic resin-made protector (case) 32 mounted on a slide door 68 of an automobile, and a metallic leaf spring 70 which is fixed at one end within the protector and supports and urges a wire harness 69 upwardly at the other end. The protector 32 is formed by a base 32a and a cover 32b (FIG. 12).

The wire harness 69 is installed to extend to the slide door from an opening 71 at a front end of the protector 32, and is installed to extend from an elongated opening 72 at a lower end of the protector 32 via an intervening space 73 to a harness fixing member 12 (FIG. 12) disposed in the vicinity of a vehicle body (74)-side step, and is connected from the harness fixing member 12 to a wire harness (not shown).

The wire harness 69 includes a plurality of insulating sheathed wires and a bendable corrugated tube made of a synthetic resin. The corrugated tube has an oval cross-section (flattened type), and is installed between the protector 32 and the harness fixing member 12, with its longer diameter portion disposed vertically.

When the slide door 68 of FIG. 10 is fully closed, the wire harness 69, while bending the leaf spring 70 downward, is pulled rearward, with the harness fixing member 12 serving as a support point, and when the slide door 68 is fully opened (FIG. 11 shows a condition immediately before the fully-opened condition), the wire harness 69, while bending the leaf spring 70 downward, is pulled forward, with the harness fixing member 12 serving as the support point, and when the slide door 68 is half opened, the wire harness 69 tends to hang down as indicated in chain lines of FIG. 12, but is urged upward by the leaf spring 70, so that its surplus length is absorbed, and the hanging-down and the catching of the wire harness 69 resulting therefrom at the time of closing the door are prevented.

[Patent Literature 1] JP-A-2001-122054 (FIG. 1)
[Patent Literature 2] JP-A-2001-151042
[Patent Literature 3] JP-A-2002-17032 (FIGS. 4 to 5)

However, in the above first power feeding apparatus 51 of FIG. 8, there has been a problem that the number of the parts and the weight are increased by the long guide rail 53 and the links 55, 56. In the above second power feeding apparatus 62 of FIG. 9, the wire harness 66 is bent in a complicated manner in accordance with the pivotal movement of each link 65, and therefore there has been a fear that the durability of the wire harness 66 is lowered.

Furthermore, in the above third power feeding apparatus 67 of FIG. 10, a surplus length of the wire harness 69 is absorbed (received) into the protector 32, and therefore there has been a problem that the protector 32 is large in size, and occupies a large area inside the slide door 68, so that the degree of freedom of arrangement of other auxiliary equipments, etc., is limited. And besides, the wire harness 69 is received in a bent manner within the protector, and therefore there has been a problem that the long wire harness 69 is needed (the corrugated tube and a wire portion become long), so that the high cost and the increased weight are encountered.

Furthermore, in each of the above power feeding apparatuses 51, 62, 67, the amount of sliding of the slide door increases and decreases depending on the kind of a vehicle, and therefore the length of the link 55, 56, 65, the size of the protector 32 and the length of the wire harness 57, 66, 69 must be changed for each kind of vehicle, and there has been encountered a problem that the cost attributable to the time and labor required for design changes and the increase of product numbers (numbers, that is, kinds of the parts), as well as the management cost, increases.

These fears can arise similarly even in the case where for example, each power feeding apparatus is applied not only to the slide door of the automobile but also to a slidable structural body such as a slide door of a train, etc., and a slide door of a producing apparatus, a detecting apparatus, etc. In this case, a vehicle body, an apparatus body, etc., are generically called a fixed structural body.

SUMMARY

In view of the above-mentioned points, it is an object of the present invention to provide a power feeding apparatus for a slidable structural body which is simply constructed with a small number of parts, and can be disposed in a space-saving manner at a low cost by overcoming a large design of a protector (case) and a long design and a heavyweight design of a wire harness, and besides can promote a low-cost design without increasing product numbers for each kind of vehicle as much as possible.

In order to achieve the above object, a power feeding apparatus of the present invention for a slidable structural body includes a link arm which is provided on one of the slidable structural body and a fixed structural body so as to be pivotally moved in a harness surplus length-absorbing direction of a wire harness, a harness holding portion provided on a distal end side of the link arm; and a harness fixing portion provided on the other of the slidable structural body and the fixed structural body, and the link arm is formed so as to be expanded and contracted in a longitudinal direction of the link arm, and the wire harness is installed to extend from the harness holding portion to the harness fixing portion.

With the above construction, for example, the link arm is disposed at the slidable structural body, and when the slidable structural body is moved in opening and closing directions relative to the fixed structural body, the wire harness is pulled with the harness fixing portion serving as a support point at the time of fully opening and at the time of fully closing, and the link arm, while pivotally moved in a direction opposite to the surplus length absorbing direction, is expanded, and at the time of half opening of the slidable structural body, the wire harness tends to hand down because of its own weight, but the link arm, while pivotally moved in the surplus length-absorbing direction by the rigidity of the wire harness, etc., is compressed (shortened), thereby preventing the hanging-down of the wire harness. Particularly at the time of fully opening of the slidable structural body and at the time of fully closing, the link arm is expanded, and therefore the wire harness between the harness holding portion of the link arm and the fixed structural body-side harness fixing portion is installed with the shortest distance, so that a shortened design of the wire harness is achieved. And besides, a stroke difference of the slidable structural body for each kind of vehicle is absorbed within the range of the expanding/contracting stroke of the link arm, and the link arm and the wire harness can have a common use design for each kind of vehicle, etc.

Preferably, the link arm has a resilient body for urging the link arm in a direction to shorten its length.

Also, preferably, the resilient body urges the first link arm and the second link arm in the shortening direction.

With the above construction, at the time of half opening of the slidable structural body, the link arm is compressed (shortened) by an urging force of the resilient body. At the time of fully closing of the slidable structural body and at the time of fully opening, the link arm is expanded against the urging force of the resilient body. In the link arm, one link member is slidably engaged with the other link member, and the two link members are urged in the compressing direction by the resilient body such as a spring member.

Preferably, the link arm has a fixing member for fixing the link arm with a required length.

With the above construction, even if the amount of the stroke of the slidable structural body differs according to the kind of vehicle, the length of the link arm is adjusted (increased or decreased) for each kind of vehicle, and by doing so, the difference in the sliding stroke can be dealt with out changing the length of the wire harness. As means for fixing the length of the link arm, preferably, one link member and the other link member forming the link arm are fixed to each other by screw fastening or the like. By fixing the link arm, the automatic expanding and contracting movement of the link arm is prevented.

Preferably, the link arm is urged by a resilient member so as to be pivotally moved in the harness surplus length-absorbing direction.

With the above construction, the link arm is urged in the surplus length-absorbing direction by the resilient member, and is pivotally moved, together with the wire harness, in the surplus length-absorbing direction, so that a harness surplus length is positively absorbed. As the resilient member, a torsion coil spring is suitable from a space-saving point of view.

Preferably, a harness guide is provided along the link arm, and a wire portion of the wire harness, while having a surplus length, is installed along the harness guide.

With the above construction, when the wire portion of the wire harness is pulled in accordance with the pivotal movement of the link arm, the surplus length portion is expanded and contracted to absorb a pulling force since the wire portion has the surplus length. Preferably, the harness guide is a tubular one, and the wire portion is received therein, and is protected from the exterior. Preferably, the harness guide is so formed as to be expanded and contracted together with the link arm.

In the above construction, it is not necessary that the wire harness be received in a bent manner within the protector as in the conventional case, and the wire harness is installed between the harness holding portion at the distal end side of the link arm and the mating-side harness fixing portion with the shortest distance, and therefore the wire harness is shortened, and the harness surplus length is shortened, so that the hanging-down of the wire harness is suppressed, and the reduction of the cost, the lightweight design, the facilitation of the wire passing operation for passing the wire harness into a protection tube, the elimination of the catching of the harness resulting from the hanging-down, etc., are achieved. Furthermore, the power feeding apparatus is formed into the compact design and lightweight design without using a protector, and therefore the degree of freedom of arrangement of the other parts within the slidable structural body increases, and also the operation for mounting on the slidable structural body, etc., is effected easily. Furthermore, the link arm is expanded at the time of fully closing of the slidable structural body and at the time of fully opening, and therefore the length of the wire harness can be set to a short length, and the low-cost design and lightweight design of the wire harness can be achieved. Furthermore, even if the amount of sliding of the slidable structural body differs according to the kind of vehicle, etc., the link arm is expanded and contracted to absorb the difference in the sliding amount of the slidable structural body, and therefore the link arm and the wire harness can have the common use design, and the low-cost design is promoted.

In the above construction, the compressing operation of the link arm is positively effected by the resilient urging, and therefore the link arm is positively expanded when necessary (at the time of fully opening of the slidable structural body and at the time of fully closing), and the shortened design of the wire harness is more positively achieved.

In the above construction, for example, even if the amount of the stroke of the slidable structural body differs according to the kind of vehicle, the length of the link arm is adjusted (increased or decreased), and by doing so, this can be dealt with out changing the length of the wire harness, and therefore with the common use design of the link arm and the wire harness, the low-cost design can be achieved. Incidentally, the automatic expanding and contracting operation of the link arm is not effected, and therefore its effect is eliminated.

In the above construction, the pivotal movement of the link arm in the harness surplus length-absorbing direction is positively effected by the urging force of the resilient member, and the absorption of the harness surplus length is positively effected, and a fear for the catching of the wire harness is positively eliminated, and the reliability of the continuous power feeding is enhanced.

In the above construction, a pulling force of the wire portion extending along the link arm is absorbed in accordance with the pivotal movement of the link arm, and therefore a load does not act on the wire portion, and the reliability of the continuous power feeding is enhanced.

BRIEF DESCRIPTION OF THE DRAWINGS

The above object and advantages of the present invention will become more manifest by the description in DETAILED DESCRIPTION OF EXEMPLARY EMBODIMENTS with reference to the accompanying drawings.

FIG. 3A is a front-elevational view of the link arm at the time of compression, and FIG. 3B is a front-elevational view of the link arm at the time of expansion, and FIG. 3C is a cross-sectional view taken along the line A-A of FIG. 3B;

DETAILED DESCRIPTION OF EXEMPLARY EMBODIMENTS

Figure 1A:
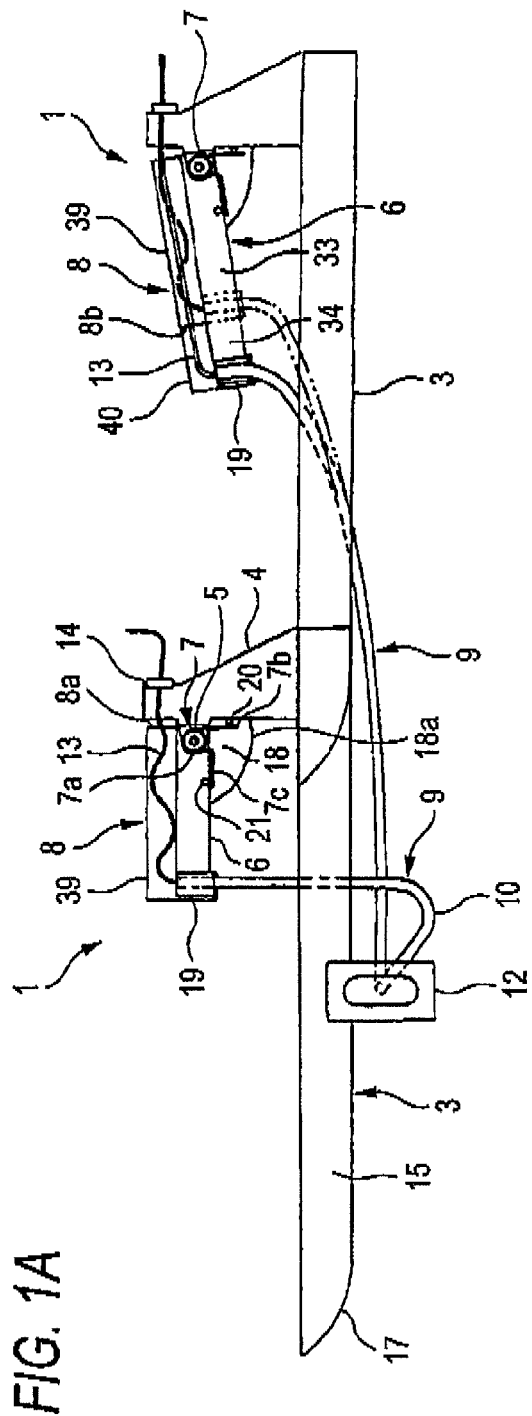
FIG. 1A is a front-elevational view of one embodiment of a power feeding apparatus of the present invention for a slidable structural body, showing a condition when the slidable structural body is fully closed and also a condition when it is half opened.
Figure 1B:
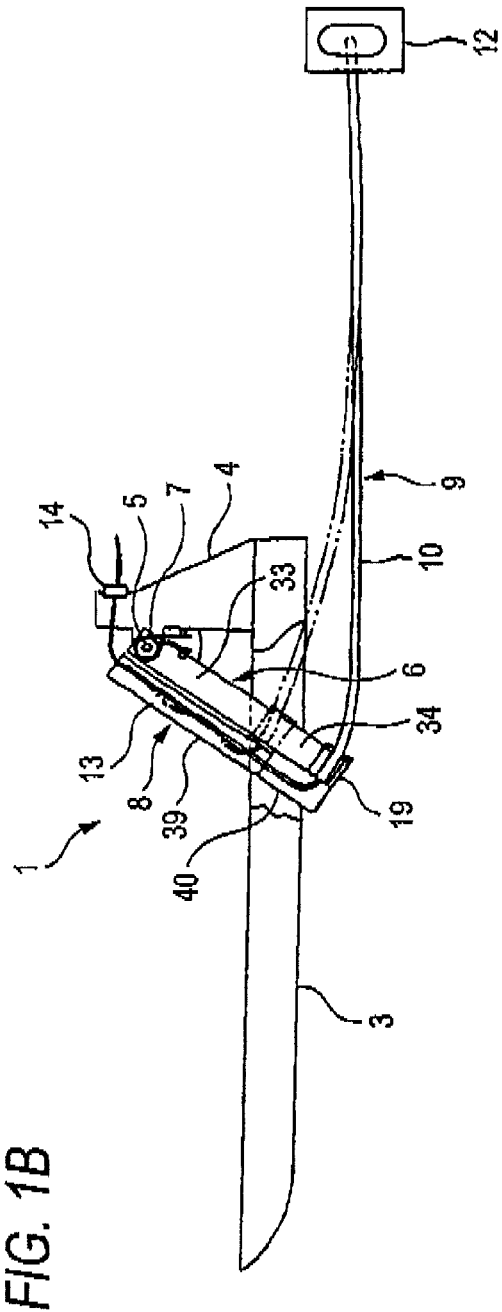
FIG. 1B is a front-elevational view showing a condition when the slidable structural body is fully opened.
Figure 2A:
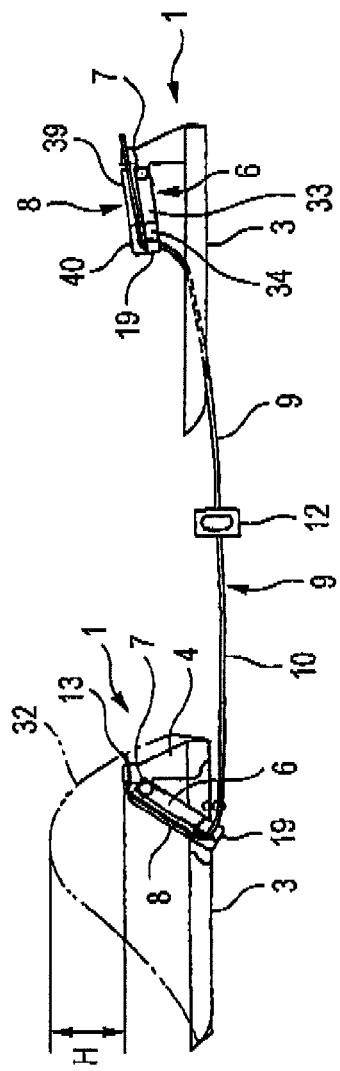
FIG. 2A is a front-elevational view showing the power feeding apparatus at the time of fully opening of the slidable structural body and at the time of fully closing thereof.
Figure 2B:
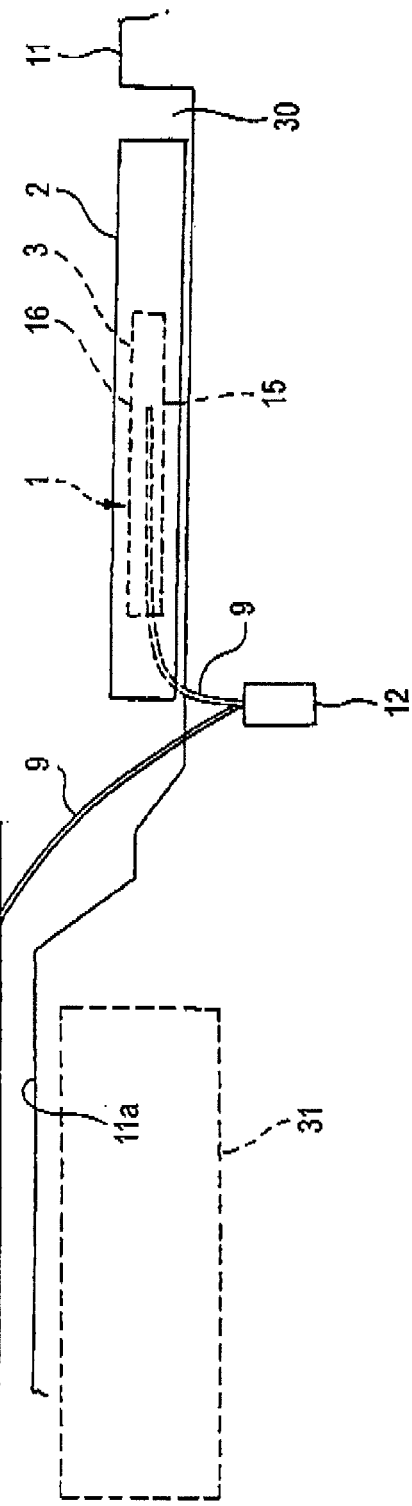
FIG. 2B is a plan view thereof.

FIG. 1A and FIG. 1B show one embodiment of a power feeding apparatus of the present invention for a slidable structural body, and FIG. 2A and FIG. 2B show a condition in which the power feeding apparatus is mounted on a slide door of an automobile. For convenience' sake, FIG. 1A shows in solid lines a condition at the time of fully closing of the slide door and the condition at the time of half opening, and FIG. 1B shows a condition at the time of fully opening of the slide door.

As shown in FIG. 1, this power feeding apparatus 1 is mounted on the slide door 2 (FIG. 2), and includes a synthetic resin-made guide case 3 of a narrow-width elongated shape, a support post 4 extending in an upstanding manner from a front end side of the guide case 3, one link arm 6 mounted on the support post 4 through a shaft portion 5 so as to be pivotally moved and also to be expanded and contracted in a longitudinal direction, a torsion coil spring (resilient member) 7 for urging the link arm 6 upwardly, and a harness guide 8 fixed along the link arm 6.

One end portion of a synthetic resin-made corrugated tube 10 of a wire harness 9 is fixed to a distal end portion of the link arm 6, and the corrugated tube portion 10 is installed to extend through the narrow elongated frame-like guide case 3 to a harness fixing member 12 on a vehicle body (fixed structural body) 11 (FIG. 2).

The other end portion of the corrugated tube 10 is fixed to the harness fixing member 12, and a wire portion (not shown) led out of the other end portion of the corrugated tube 10 is installed on the vehicle body, and is connector connected to a vehicle body-side wire harness (not shown). The corrugated tube 10 is an existing harness protection tube (exterior material) which has a circumferential channel-shaped groove and a circumferential ridge alternately arranged in a longitudinal direction of the tube so that the tube can be bent.

Figure 10:
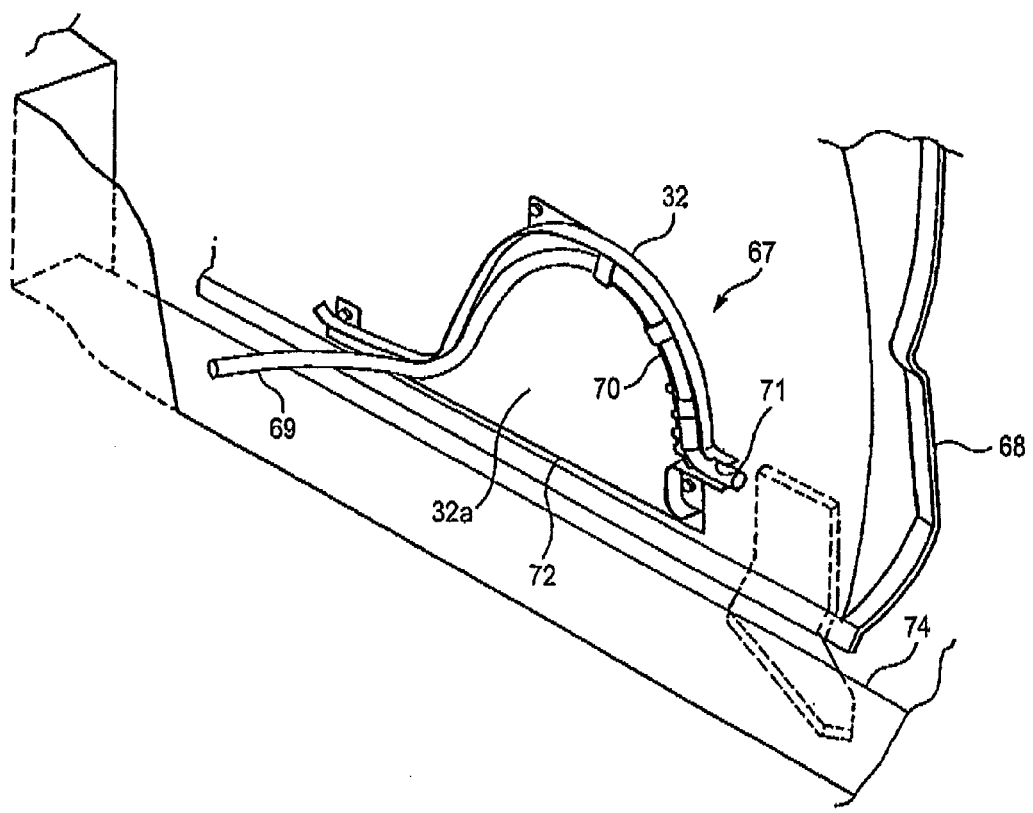
FIG. 10 is a perspective view showing a third form of a conventional power feeding apparatus for a slidable structural body at the time of fully closing of the slidable structural body.
Figure 11:
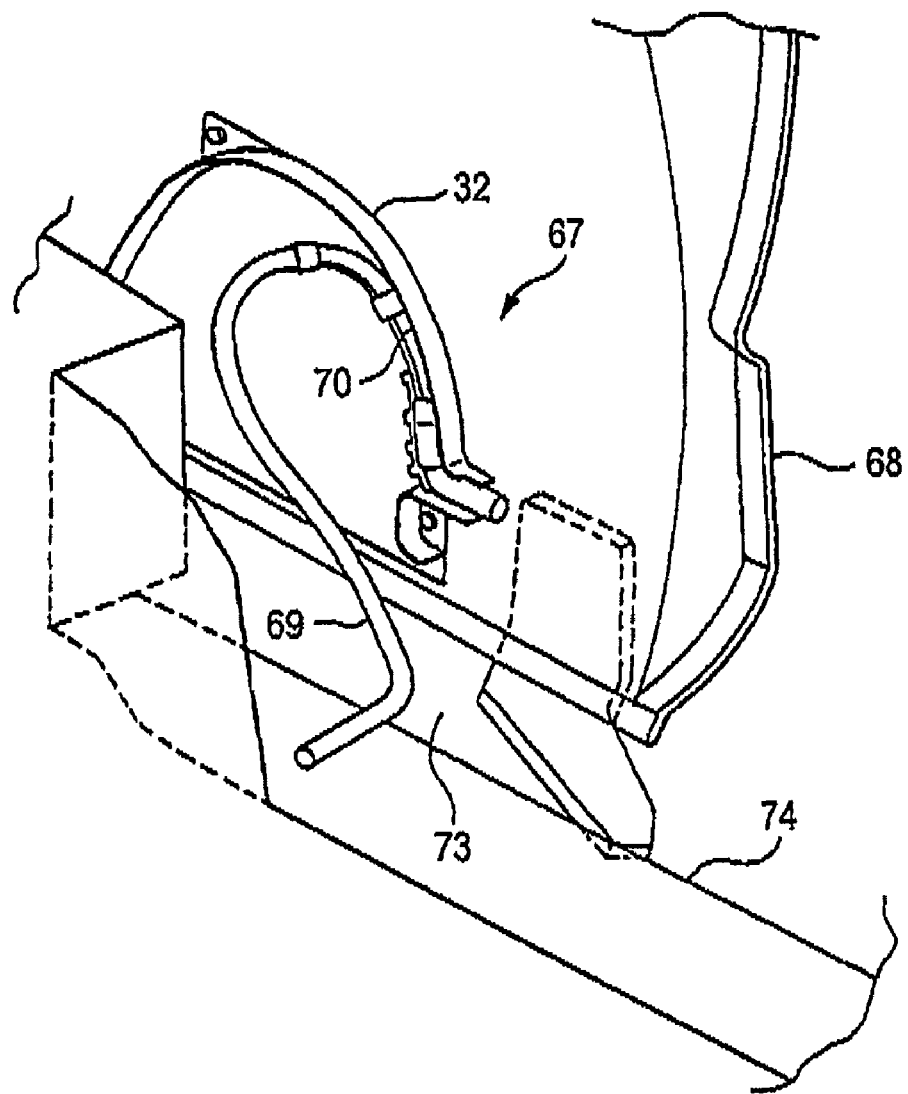
FIG. 11 is a perspective view showing the third form of the conventional power feeding apparatus for the slidable structural immediately before the slidable structural body is fully opened.

Like the corrugated tube of the conventional example of FIG. 10, the corrugated tube 10 of this example has an oval cross-section, and is arranged with its longer diameter disposed vertically. Of course, a corrugated tube having a round cross-section can be used.

A wire portion 13 led out of the one end portion of the corrugated tube 10 is installed along the harness guide 8 while having a surplus length, and is fixed by a harness fixing portion 14 on the support post 4, and is installed within the slide door, and is connector connected to slide door-side auxiliary equipments and wire harness (not shown).

The guide case 3 has the corrugated tube portion 10 of the wire harness 9 (led out of the link arm 6) passed therethrough in the upward-downward direction so as to slidingly guide the corrugated tube portion in the longitudinal direction of the vehicle, and the guide case is formed by a near-side cover 15 and a deep-side base 16 (FIG. 2) into a rectangular frame-like shape elongated in the longitudinal direction of the vehicle. A lower portion 17 of a rear end of the guide case 3 is formed into a curved shape so as to smoothly slide the wire harness.

The vertical plate-like support post 4 is integrally resin-molded, for example, on a front end portion of the base 16 of the guide case 3. The base 16 and the cover 15 are fixed to each other by retaining members (not shown), and in a disassembled condition, the wire harness 9, together with the harness fixing member 12, can be easily passed through the guide case 3. Incidentally, in the specification, the forward and rearward directions are the same as those of the vehicle.

The support post 4 has a bearing wall 18 projecting rearwardly from a rear end of an upper portion thereof, and the link arm 6 is pivotally supported on the bearing wall 18 by the shaft portion 5. The harness fixing portion 14 is provided at a front end of an upper portion of the support post 4. The harness fixing portion 14 is, for example, a fixing plate or the like to which the wire is fixed by a band or by winding a tape.

A harness holding portion 19 is provided at the distal end portion (free end portion) of the link arm 6, and the shaft portion 5 is provided at a proximal end portion. The harness holding portion 19 has a hole portion (for the passage of the corrugated tube 10 therethrough) formed, for example, in a split-type block portion, and has ribs (not shown) which are formed on an inner peripheral surface of the hole portion and are engaged in the circumferential channel-shaped groove of the corrugated tube 10.

The shaft portion 5 may be one which extends through a hole portion of the link arm 6 and is fixed to the bearing wall 18 of the support post 4, or may be one which is integrally formed on and projects from the link arm 6 and is angularly movably engaged in a hole portion of the bearing wall 18.

An annular coil portion 7a of the torsion coil spring 7 is fitted on the shaft portion 5, and one straight portion 7b of the torsion coil spring 7 continuous with the coil portion 7a abuts against a stop pin 20 on the bearing wall 18, and the other straight portion 7c abuts against a stop pin 21 on the link arm 6, and the link arm 6 is urged upwardly by a force of the torsion coil spring 7, and the link arm 6 is disposed horizontally in a free condition (a condition in which a pulling force does not act).

The stop pin 20 on the bearing wall 18 is formed on and projects from a lower extension wall portion 18a, and the extension wall portion 18a is directed downward, and is formed into a fan-shape, and smoothly guides a reverse surface of the link arm 6 in slidingly contacting relation thereto. For example, the link arm 6 abuts at its proximal end surface against a stopper projecting portion (not shown) on the support post 4, so that the link arm is prevented from being pivotally moved upwardly from the horizontal position.

The harness guide 8 is disposed along an upper surface of the link arm 6, and is fixed thereto. The harness guide 8 of this example is formed such that it can be expanded and contracted together with the link arm 6. The harness guide 8 is generally equal in length to the link arm 6, and preferably is formed into a rectangular tubular shape, using a synthetic resin material, and the wire portion 13, while having a surplus length, is received within an internal space thereof such that the wire portion is bent into a wavy shape. A harness protection tube or the like having a relatively high rigidity can be used as the harness guide 8. In FIG. 1, the wire 13 received in the harness guide 8 is indicated by a solid line.

The harness guide 8 is provided for absorbing a surplus length of the wire portion 13 developing in accordance with the pivotal movement of the link arm 6, and it is not necessary in the case where the wire portion 13 is installed along a center axis of the link arm 6. In this case, the wire portion 13 is led out from the center of the harness holding portion 19 (at the distal end of the link arm) along the link arm 6, and passes through the center of the shaft portion 5 or the vicinity thereof, and reaches the harness fixing portion 14 on the support post 4.

The harness guide 8 can be formed such that it can not be expanded and contracted (It is formed into a length generally equal to the length of the link arm 6 obtained when the link arm is compressed), and when the link arm 6 is expanded, the wire portion 13 of the wire harness 9 is led out from an opening 8b at the distal end of the harness guide 8 to the harness holding portion 19 at the distal end of the link arm.

The vehicle body-side harness fixing member (harness fixing portion) 12 is an existing one, and for example, includes an inner member (not shown) which has at its inner peripheral surface ribs (not shown) engaged in the circumferential channel-shaped groove of the corrugated tube 10 and is formed into a split type, and an outer member (substituted by reference numeral 12) holding the inner member in such a manner that the inner member can be angularly moved in the circumferential direction.

Figure 3A:
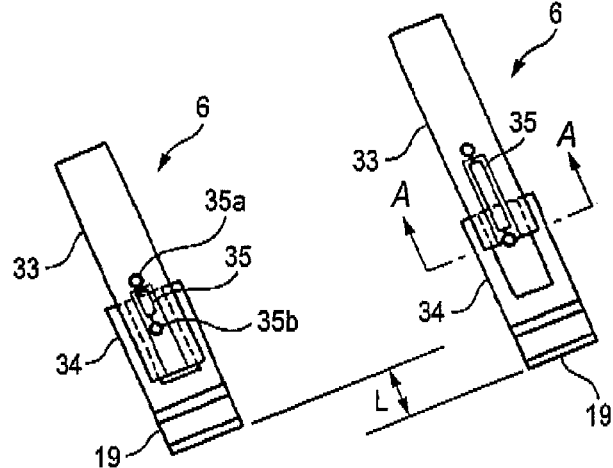
FIGS. 3A to 3C show one form of link arm of the power feeding apparatus.
Figure 3B:
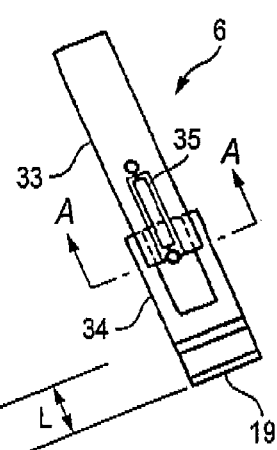
Figure 3C:
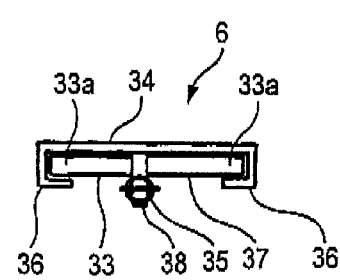

FIG. 3A to FIG. 3C show one form of expansion/contraction mechanism of the link arm.

This link arm 6 uses a synthetic resin or metal as a material, and includes a narrow inner link (one link member) 33, a wide outer link (the other link member) 34 slidably engaged with a distal end side of the inner link 33, and a tension coil spring (resilient body) 35 urging the inner link 33 and the outer link 34 in a compressing (shortening) direction. The harness holding portion 19 is provided at a distal end of the outer link 34.

The inner link 33 is formed into a flat plate-like shape, and the outer link 34 has sliding engagement portions 36 of a generally U-shape formed respectively at its opposite sides in a direction of a plate width, and the sliding engagement portions 36 are slidably engaged respectively with opposite side portions 33a of the inner link 33 in a direction of a plate width. The tension coil spring 35 is disposed in an opening 37 between the two sliding engagement portions 36, and a hook 35a at one end of the tension coil spring 35 is fixed to a retaining portion (not shown) of the inner link 33, and a hook 35b at the other end of the tension coil spring 35 is fixed to a retaining portion 38 of the outer link 34.

As shown in FIG. 3A, in the free condition (the condition in which a pulling force does not act on the link arm 6), the outer link 34 is resiliently moved in the compressing direction (toward the shaft portion 5) along the inner link 33 by a pulling force of the tension coil spring 35, and when a pulling force acts on the link arm 6 as shown in FIG. 3B, the outer link 34 is resiliently moved in an expanding direction (toward the distal end of the inner link 33) along the inner link 33 against the urging force of the tension coil spring 35. The difference between the length of the link arm 6 of FIG. 3A and that of FIG. 3B is an expansion/contraction amount L.

The expansion/contraction mechanism of the link arm 6 is not limited to the example of FIG. 3, and for example the outer link 34 can be formed into a generally rectangular tubular shape, or the arrangement of the inner link 33 and outer link 34 can be reversed in the forward-rearward direction with respect to that of FIG. 3, in which case the harness holding portion 19 is provided at a distal end of the inner link 33 while the shaft portion 5 (FIG. 1) is provided at a proximal end of the outer link 34. Furthermore, instead of the tension coil spring 35, other form of resilient body can be used.

In the embodiment of FIG. 1, like the link arm 6, the harness guide 8 is formed by an inner guide 39 and an outer guide 40 so as to be expanded and contracted, and preferably the inner guide 39 is fixed to the inner link 33, and the outer guide 40 is fixed to the outer link 34. The outer guide is slidably engaged with the inner guide, and therefore the wire portion 13 of the wire harness 9 is always protected within the harness guide 8 without being exposed to the exterior, and is smoothly guided, so that a surplus length is absorbed.

When the slide door 2 is fully closed (the slide door 2 is slid toward the front of the vehicle to be fully closed) as shown in a right illustration of FIG. 1A, the wire harness 9 is pulled rearward with the vehicle body (11)-side harness fixing member 12 serving as a support point, and in accordance with this, the link arm 6 is pivotally moved downward against the bias of the torsion coil spring 7, and is inclined downwardly relative to the horizontal, and the outer link 34 is moved along the inner link 33 in the expanding direction. The harness guide 8 is expanded together with the link arm 6.

The link arm 6 is expanded, and therefore the length of the wire harness 9 is shortened as compared with the case (indicated in chain lines) where it can not be expanded. Namely, the continuous power feeding can be effected using the short wire harness 9 and the corrugated tube 10 for it.

Furthermore, the link arm 6 is pivotally moved downward, so that the horizontal distance between the harness holding portion 19 at the distal end of the link arm and the vehicle body-side harness fixing member 12 becomes the shortest, and therefore a set length of the corrugated tube portion 10 of the wire harness 9 can be made the shortest.

Figure 12:
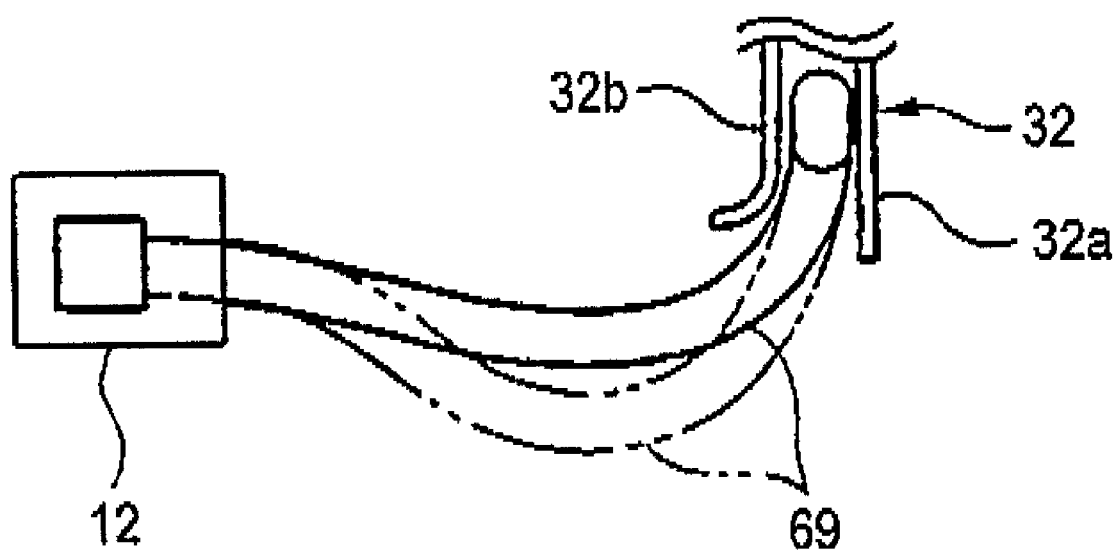
FIG. 12 is a side-elevational view showing a hung-down condition of a wire harness.

When the slide door 2 is half opened as shown in a left illustration of FIG. 1, the wire harness 9 tends to hang down between the slide door 2 and the vehicle body 11 (FIG. 2). However, the link arm 6 is pushed upward by the urging force of the torsion coil spring 7, and the harness holding portion 19 at the distal end side of the link arm 6 moves upward, so that the corrugated tube portion 10 of the wire harness 9 is pulled up, thereby preventing the hanging-down (For example, a condition indicated in solid lines in FIG. 12 is obtained).

The link arm 6 is released from the pulling by the wire harness 9, and is compressed (shortened) by the force of the tension coil spring 35 (FIG. 3). Simultaneously with this, the harness guide 8 is also compressed, and the wire portion 13 within the harness guide is bent into a wavy shape while having a surplus length (looseness).

When the link arm 6 is located (returned) horizontally, the horizontal distance between a front end 8a of the harness guide 8 and the support post (4)-side harness fixing portion 14 is shortened, so that a surplus length of the wire portion 13 develops. The surplus length of the wire portion 13 is received and absorbed within the harness guide 8.

When the slide door 2 is fully opened as shown in FIG. 1B, the wire harness 9 is pulled forward with the vehicle body-side harness fixing member 12 serving as the support point, and in accordance with this, the link arm 6 is much pivotally moved downward against the bias of the torsion coil spring 7, and is inclined generally vertically, and the outer link 34 is pulled downward by the wire harness 9, and projects from the inner link 33 to be extended. The harness guide 8 is expanded together with the link arm 6, and in accordance with the pivotal movement of the link arm 6, the wire portion 13 within the harness guide 8 is extended into a condition approximate to a straight condition, with the support post (4)-side harness fixing portion 14 serving as the support point.

The link arm 6 is pivotally moved downward, and the outer link projects downwardly from the inner link, and therefore the distance between the harness holding portion 19 at the distal end of the outer link and the vehicle body-side harness fixing member 12 becomes the shortest as indicated in solid lines, and the set length of the corrugated tube portion 10 of the wire harness 9 can be made the shortest. In the case where the link arm 6 is not expanded and contracted, the length of the corrugated tube 10 of the wire harness 9 need to be longer as indicated in chain lines in FIG. 1B as compared with the case where the link arm is expanded and contracted.

During the opening and closing of the slide door 2, the link arm 6 is expanded and contracted, and therefore for example, even when the amount of stroke of the slide door 2 changes for each kind of vehicle, the corrugated tube portion 10 of the wire harness 9 is utilized without making a design change for the length of the corrugated tube portion if it is within an area of expansion and contraction of the link arm 6, and the stroke difference of the slide door 2 can be absorbed by the expanding and contracting movement of the link arm 6. Therefore, product numbers of the link arm 6 are reduced, and a management cost is reduced, and a low-cost design is achieved by a common use design of the wire harness (the corrugated tube 10 and the wire portion 13).

As shown in FIG. 1B, the distal end side of the link arm 6, together with the harness guide 8, extends through the frame-like guide case 3, and is smoothly positioned and guided along the inner surface of the guide case 3 without receiving a gouging force exerted in the harness pulling direction. In accordance with the opening and closing of the slide door 2, the corrugated tube portion 10 of the wire harness 9 is smoothly swung along the guide case 3 in the forward-rearward direction of the vehicle.

As shown in FIG. 2B, the slide door 2, when fully opened, closely contacts the vehicle body 11 to close an opening 30 for getting-on and getting-off purposes, and is moved apart outwardly from the vehicle body 11 immediately after opening the door, and is disposed along an outer surface 11a of the vehicle body 11 at the time of fully opening. This is the same as the conventional case. Reference numeral 31 denotes a rear tire.

As shown in FIG. 2A in which the difference in height between the conventional protector (indicated by a chain line) 32 and the power feeding apparatus 1 of the present invention is indicated by a dimension H, the power feeding apparatus 1 of the present invention is formed into a low height about a half of the height of the conventional protector 32. Therefore, a space occupied by the power feeding apparatus 1 within the slide door 2 is reduced, and the degree of freedom of arrangement of the auxiliary equipments (electrical parts, equipments, etc.) is enhanced.

Furthermore, the wire harness 9 is installed to extend directly from the link arm 6 to the vehicle body in such a manner that the wire harness 9 is not bent within the protector, and therefore the length of the wire harness 9 can be shortened, and the low-cost design and the lightweight design are achieved, and the conveyance and an operation for mounting on the vehicle can be easily effected. Furthermore, the corrugated tube 10 can be shortened, and therefore an operation for passing the wire 13 into the corrugated tube (particularly a tube having no longitudinal slit) is easy.

Furthermore, a surplus-length portion of the wire harness 9 does not need to be received within the protector 32, and therefore the hanging-down of the wire harness 9 as indicated by solid lines in FIG. 12 is less liable to occur between the slide door 2 and the vehicle body 11, and a fear for the catching at the time of closing the slide door is eliminated.

Figure 4:
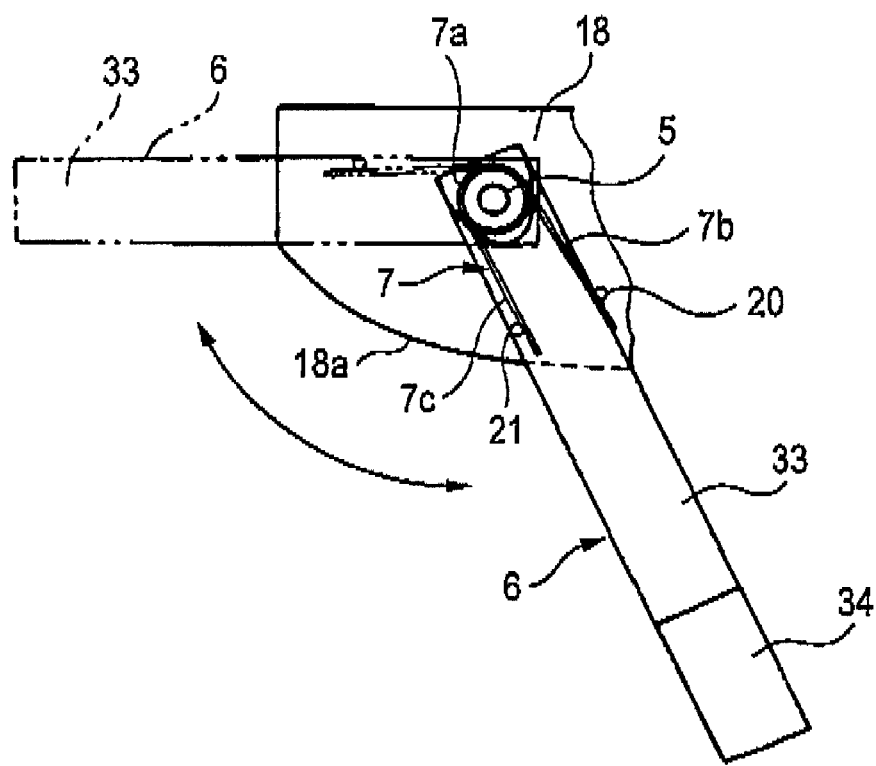
FIG. 4 is a front-elevational view showing one form of locus of pivotal movement of the link arm.

FIG. 4 shows another form of locus of pivotal movement of a link arm 6.

In this example, when the slide door 2 is fully opened, a wire harness 9 is pulled forward, so that the link arm 6 is pivotally moved downward counterclockwise (in FIG. 4) through an angle of more than 90° forwardly beyond the vertical against the bias of the torsion coil spring 7 as indicated in solid lines, and an outer link 34 projects from an inner ring 33 to be extended against the bias of a tension coil spring 35 (FIG. 3). A stop pin 20 on a bearing wall 18 is disposed more forwardly than in the example of FIG. 1.

When a pulling force of the wire harness 9 (FIG. 1) is released, the link arm 6 is restored clockwise by the force of the torsion coil spring 7 as indicated in chain lines, and the outer link 34 is compressed along the inner link 33 by a restoring force of the tension coil spring 35 (FIG. 3).

A harness guide 8 (FIG. 1) is provided along the link arm 6 so as to be expanded and contracted therewith, and a surplus length of a wire portion 13 (FIG. 1) of the wire harness 9 is absorbed within the harness guide, and these are the same as in the above example. The construction of the torsion coil spring 7, etc., are the same as in the above example, and therefore reference numerals identical to those of the above example are applied, and detail description will be omitted.

Figure 5:
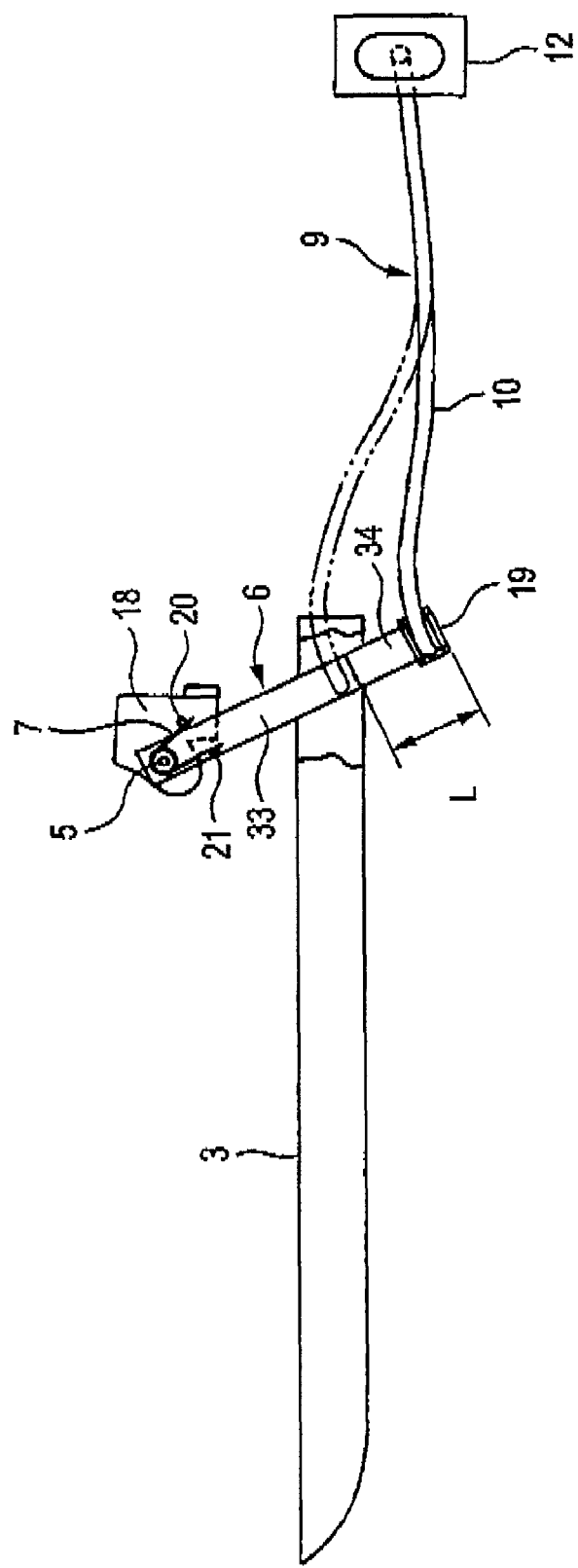
FIG. 5 is a front-elevational view showing an installed condition of a wire harness at the time of pivotal movement of the link arm.

FIG. 5 shows a locus of installation of the wire harness 9 in accordance with the pivotal movement of the link arm 6 of FIG. 4.

When the slide door 2 is fully opened, the link arm 6, while expanded, is much pivotally moved forward, and extends through a guide case 3, and reaches a front end of the guide case 3, and a length of a wire harness portion (a corrugated tube portion 10) between a harness holding portion 19 at a distal end of the link arm and a vehicle body-side harness fixing member 12 is shorter than the wire harness portion 10 of FIG. 1B indicated in chain lines. A bearing wall 18 in the example of FIG. 5 is provided without using a support post.

Figure 6A:
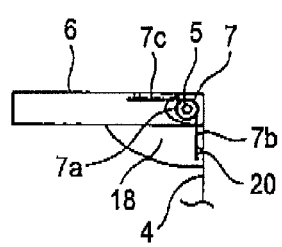
FIG. 6A to FIG. 6C are front-elevational views showing various forms of resilient members for urging a link arm.
Figure 6B:
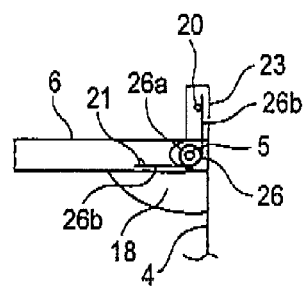
Figure 6C:
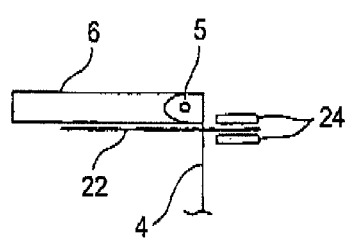

FIG. 6A to FIG. 6C show various forms of resilient members.

FIG. 6A shows a coil spring 7 similar to the above torsion coil spring, and FIG. 6B shows a coil return spring 26 which is another form of torsion coil spring, and FIG. 6C shows a leaf spring 22. Each spring 7, 26, 22 is made of a metallic material.

In the coil spring 7 of FIG. 6A, outer surfaces of two straight portions 7b,7c continuous with a coil portion 7a abut respectively against pins 20, thereby exerting an urging force in a direction to open the two straight portions 7b, 7c.

The coil return spring 26 of FIG. 6B is disposed inverted in the upward-downward direction with respect to the coil spring 7 of FIG. 6A, and an inner surface of one straight portion 26b continuous with a coil portion 26a abuts against a stop pin 20 on an upper extension portion 23 of the bearing wall 18, and an inner surface of the other straight portion 26c abuts against a link arm (6)-side stop pin 21, thereby exerting an urging force in a direction to close the two straight portions 26b, 26c.

The leaf spring 22 of FIG. 5C is disposed horizontally, and a proximal end portion of the leaf spring 22 is inserted in a gap between a pair of upper and lower projecting pieces 24 on the support post 4, and is fixed thereto, and the other portion of the leaf spring 22 except the proximal end portion supports the lower surface of the link arm 6. Simultaneously when the link arm 6 is pivotally moved downward upon pulling of the wire harness 9 (FIG. 1), the leaf spring 22 is bent downward, and when the pulling is canceled, it is restored into the horizontal by a urging force of the leaf spring 22.

Figure 7A:
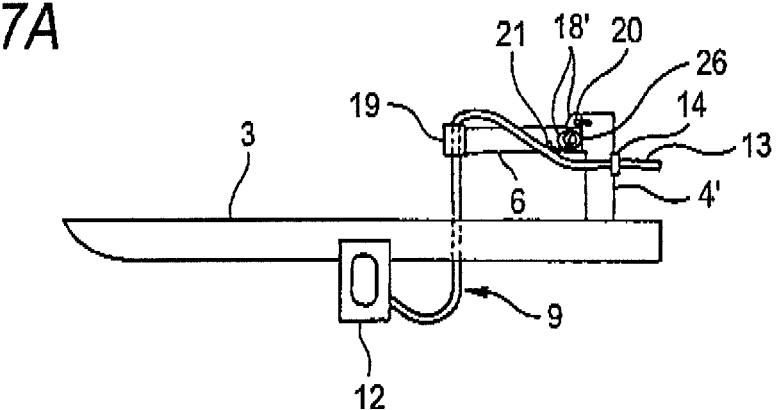
FIG. 7A to FIG. 7C are front-elevational views showing various forms of guide cases of a power feeding apparatus.
Figure 7B:
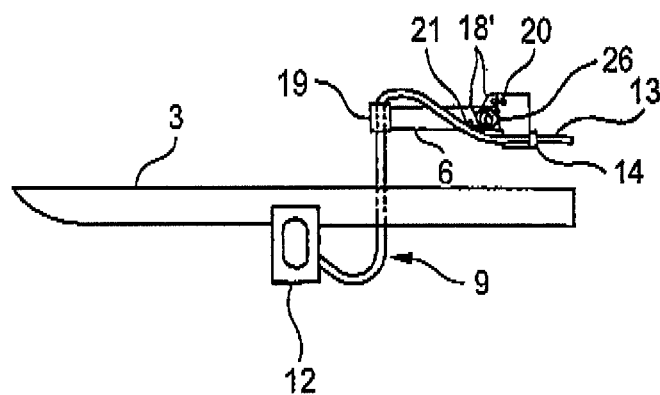
Figure 7C:
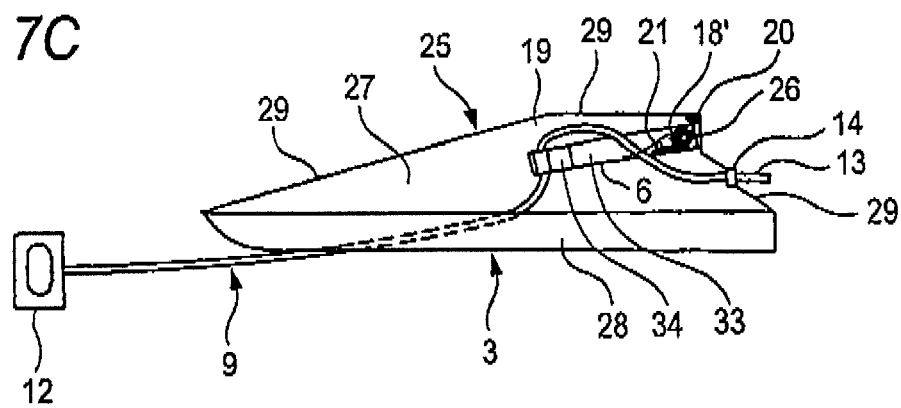
Figure 8:
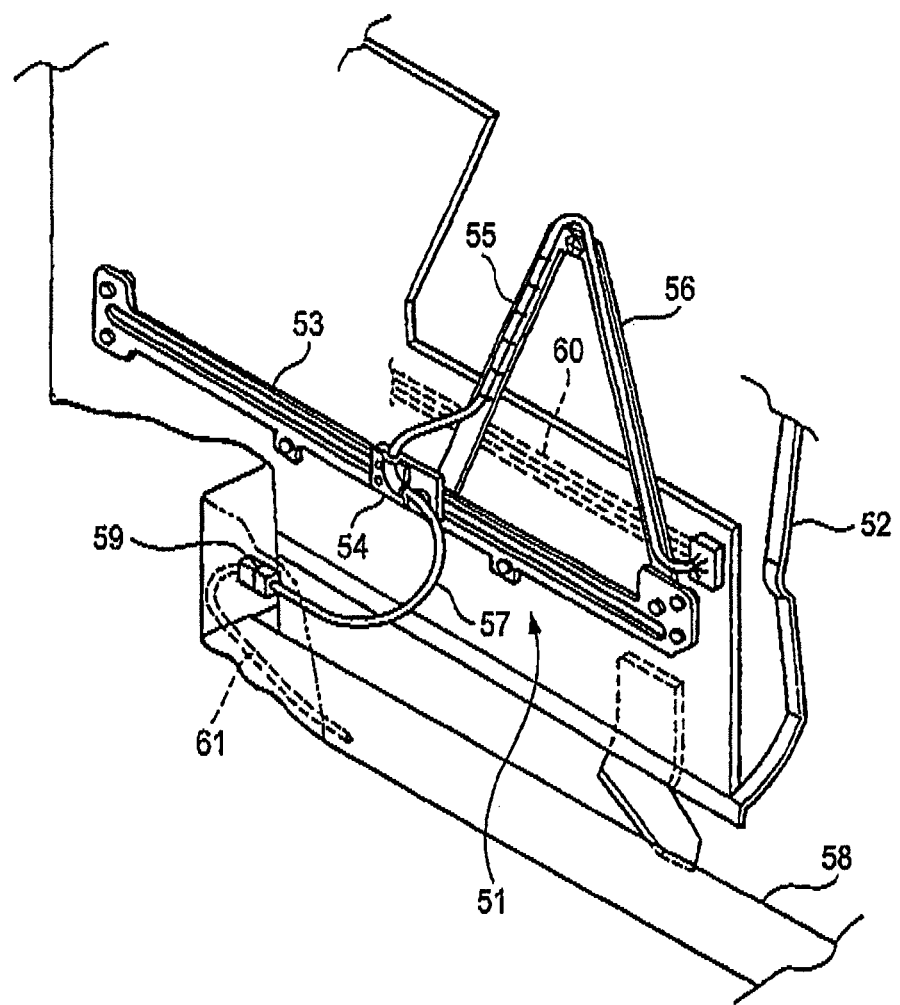
FIG. 8 is a perspective view showing a first form of a conventional power feeding apparatus for a slidable structural body.
Figure 9:
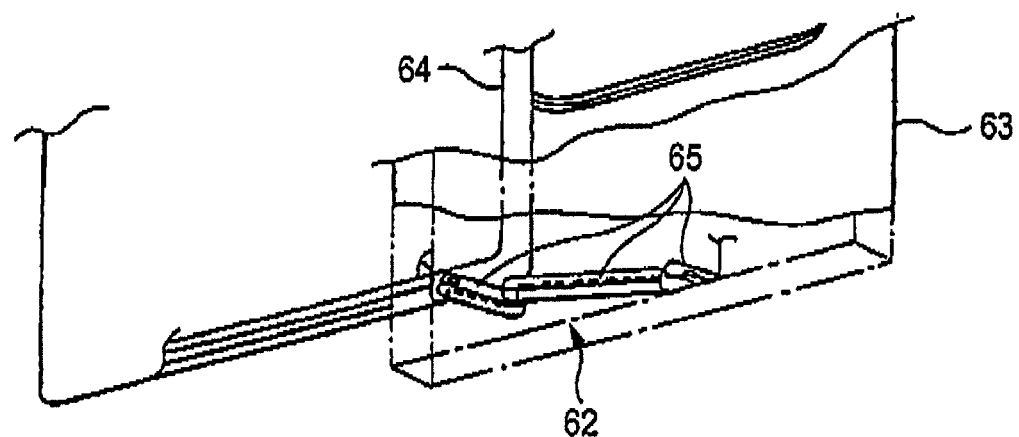
FIG. 9 is a perspective view showing a second form of a conventional power feeding apparatus for a slidable structural body.

FIG. 7A to FIG. 7C show embodiments of the above guide case 3.

FIG. 7A shows a structure in which a support post 4' having a bearing wall 18' is formed integrally with the guide case 3 similarly to the example of FIG. 1, FIG. 7B shows a structure in which a bearing wall 18' separate from the guide case 3 is provided, for example, at a door inner panel of the slide door 2 (FIG. 2), and FIG. 7C shows a structure in which there is used a protector 25 having the guide case 3 formed integrally therewith.

In each form, for example, the coil return spring 26 of FIG. 5B is used as the resilient member. The same link arm 6, the same harness holding portion 19 at a distal end thereof, the same wire harness 9 and the same vehicle body-side harness fixing member 12 are used. The harness guide 8 of FIG. 1 and the lower extension wall 18a of the support post 4 are omitted.

In FIG. 7A, as the support post 4', not a generally trapezoidal one of FIG. 2 but a straight one is used. A wire portion 13 of the wire harness 9 is installed to extend in a bent manner from the harness holding portion 19 at the distal end of the link arm 6 along the link arm 6, and is fixed at a support post-side harness fixing portion 14.

In FIG. 7B, there is no support post 4', and a wire portion 13 of the wire harness 9 is installed to extend in a bent manner from the harness holding portion 19 at the link arm 6 to a harness fixing portion 14 at a front end of the bearing wall (bearing plate) 18'. The bearing wall 18' is fixed to the metallic door inner panel by bolt fastening or the like.

In FIG. 7C, the link arm 6, while urged by the torsion coil spring 26, is pivotally movably disposed within an internal space of the protector 25 formed by a deep-side protector base 27 and a near-side protector cover (not shown). A vertical base plate portion of each of the base 25 and the cover of the protector 25 serves also as a bearing wall 18'. A pin 20 for the torsion coil spring is formed on and projects from the base 27. A harness fixing portion 14 is provided at an opening at a front end of the base 27.

The protector 25 is formed into a low height about a half of the height of the conventional (FIG. 10) protector. An opening 28 of an elongated shape similar to that of the conventional example is provided in a lower end of the protector 25. The elongated opening 28 is similar to an opening of each of the guide cases of FIG. 7A and FIG. 7B. The three sides, that is, the upper side and front and rear sides, of the protector 25 are closed by a peripheral wall 29. Only FIG. 7C shows a condition at the time of fully closing of the slide door 2 (The other ones show a condition at the time of half opening), in which the link arm 6 is in an expanded condition, that is, the outer link 34 projects from the inner link 33.

Incidentally, in each of the above embodiments, although the link arm 6 is expanded by the urging force of the resilient body 35 (FIG. 3), the resilient body can be omitted, and the link arm 6 is expanded into a required length, and in this condition it is locked (fixed) by lock members such as screw fastening.

Namely, the link arm 6 is used in common by adjusting the length thereof into a suitable length according to the kind of the vehicle, etc., and by doing so, the difference in length among the link arms 6 for various kinds of vehicles can be dealt with by one kind of link arm 6, and besides, for example, when the wire harness length must be extended by X mm (X is an arbitrary length) because of a stroke change, the increase of the wire harness length can be prevented by extending (adjusting the length on the link arm 6 by X mm.

As the lock members, for example, there are given an example in which longitudinal slots (not shown) are formed in the outer link 34 and the inner link 33, and a bolt is passed through the two slots, and the fastening is effected by a nut, an example in which a plurality of small holes (the small holes in the inner link 33 may be internally-threaded holes) are formed in the outer link 34 and the inner link 33 in parallel relation, and arbitrary ones of the holes are selected, and a bolt is passed therethrough, and the fastening is effected by a nut or a female screw, etc.

The link arm 6 is used in common for each kind of vehicle, and by doing so, the time and labor for design of the link arm 6 and the management cost are reduced, and the low-cost design is achieved by the common use design of the wire harness (the corrugated tube 10 and the wire portion 13).

Furthermore, in the above embodiments, although the outer link 34 is urged toward the inner link by the resilient body (tension coil spring) 35, thereby effecting the shortening, the resilient body 35 can be omitted, and there can be used an arrangement in which at the time of half opening of the slide door 2, the outer link 34 is pushed by the wire harness 9 to be moved toward the inner link, thereby effecting the shortening, or there can be used an arrangement in which at the time of half opening of the door, the link arm 6 is inclined upwardly relative to the horizontal, and the outer link 34 slidingly drops along the inner link 33 by its own weight, thereby effecting the shortening. At the time of fully closing of the door and at the time of fully opening of the door, the outer link 34 is pulled by the wire harness 9, and is extended, and therefore the resilient body 35 is unnecessary. As described above, there can be used an arrangement in which the inner link 33 is provided at the distal end side of the link arm 6, and the outer link 34 is provided at the proximal end side.

Furthermore, in the above embodiments, although the corrugated tube 10 is used as the harness protection tube, a resin tube having no concave and convex portions (bellows), a flexible mesh-like tube, etc., (not shown) can be used instead of the corrugated tube, or there can be used the plurality of wires 13 bundled together by tape-winding or others without using the protection tube. In these cases, the wire harness is held on and fixed to the distal end portion of the link arm by a band or the like through the harness holding portion 19 at the distal end side of the link arm.

Furthermore, in the above embodiments, although there is used the guide case 3 for guiding the wire harness 9 at the low position toward the vehicle body, for example, the guide case 3 can be omitted, and the wire harness 9 can be installed to extend directly from the harness holding portion 19 at the distal end of the link arm toward the vehicle body.

Furthermore, in the above embodiments, although the range of pivotal movement of the link arm 6 is set to less than 90° from the horizontal, the position of pivotal movement and the angle of pivotal movement of the link arm 6 can be suitably set according to the amount of the stroke of the slide door 2 and the length of the wire harness 9. For example, in case the link arm 6 is urged to be pivotally moved upwardly beyond the horizontal at the time of half opening of the slide door 2 of FIG. 1A, the increase of the harness surplus length-absorbing amount can be dealt with.

Furthermore, in the above embodiments, although there is provided the resilient member 7, 24, 26 for urging the link arm 6 in the harness surplus length-absorbing direction (upward direction), the resilient member 7, 24, 26 can be omitted, and the wire harness 9 can be restored upwardly (in the surplus length-absorbing direction), for example, utilizing the rigidity of the corrugated tube 10 at the time of half opening the slide door.

Furthermore, in the above embodiments, although the power feeding apparatus 1 is disposed vertically (vertically) at the slide door (slidable structural body) 2, the power feeding apparatus 1 can be disposed, for example, horizontally (horizontally) in the case where the slide door 2 has the sufficient thickness as when FIG. 1 to FIG. 2 are seen as plan views, and this can be applied particularly to a slide door other than that of the automobile.

Furthermore, the power feeding apparatus 1 can be horizontally (horizontally) disposed not at the slide door 2 but at the vehicle body (fixed structural body) 11, and the harness fixing member 12 can be disposed not at the vehicle body 11 but at the slide door 2.

Furthermore, in the above embodiments, although the examples in which the embodiments are applied to the slide door 2 of the automobile have been described, the above power feeding apparatus can be applied not only to the slide door 2 of the automobile but also to a slidable structural body such as a slide door of a train, etc., and a slide door of a producing apparatus, a detecting apparatus, etc. The vehicle body, etc., are generically called the fixed structural body.

Furthermore, the above power feeding apparatus for the slidable structural body is also effective as a power feeding structure for a slidable structural body, a harness installation structure for the slidable structural body, a method of feeding power to the slidable structure body, etc.

Although the present invention have been described in detail with reference to the specific embodiments, it is obvious to those skilled in the art that various changes and modifications can be added without departing the spirits and scope or intended scope of the present invention.

The present invention is based on Japanese Patent Application (Patent Application No. 2006-306641) filed on Nov. 13, 2006, and the contents thereof are incorporated herein as a reference.

What is claimed is:

1. A power feeding apparatus for a slidable structural body, comprising:
   a link arm having a base end side which is pivotally provided on one of the slidable structural body and a fixed structural body so as to be pivotally moved in a harness surplus length-absorbing direction of a wire harness;
   a harness holding portion provided on a distal end side of the link arm that is opposite the base end side, said harness holding portion retaining a first end portion of a wire harness; and
   a harness fixing portion provided on the other of the slidable structural body and the fixed structural body, the harness fixing portion retaining a second end portion of the wire harness,
   wherein the link arm is formed so as to be slidably expanded and contracted in a longitudinal direction of the link arm; and
   wherein the wire harness is installed to extend from the harness holding portion to the harness fixing portion.

2. The power feeding apparatus for a slidable structural body according to claim 1, wherein the link arm has a resilient body for urging the link arm in a direction to shorten its length.

3. The power feeding apparatus for a slidable structural body according to claim 2, wherein the link arm includes a first link arm and a second link arm, and the resilient body urges the first link arm and the second link arm in the shortening direction.

4. The power feeding apparatus for a slidable structural body according to claim 1, wherein the link arm has a fixing member for fixing the link arm with a length suitable for the sliding structural body.

5. The power feeding apparatus for a slidable structural body according to claim 1, further comprising a resilient member for urging the link arm pivotally in the harness surplus length-absorbing direction.

6. The power feeding apparatus for a slidable structural body according to claim 1, further comprising a harness guide provided along the link arm;
   wherein a wire portion of the wire harness, while having a surplus length, is installed along the harness guide.

7. The power feeding apparatus according to claim 1, wherein the link arm includes a first link arm and a second link arm, and the second link arm relatively slides with respect to the first link arm in an extending direction of the first link arm.

8. The power feeding apparatus for a slidable structural body according to claim 1, wherein the link arm telescopes in a longitudinal direction of the link arm.

9. The power feeding apparatus for a slidable structural body according to claim 7, wherein the second link arm telescopes relative to the first link arm.

10. The power feeding apparatus for a slidable structural body according to claim 3, wherein the second link arm telescopes from a distal end of the first link arm.

* * * * *